Oct. 9, 1962 P. D. COX 3,057,415
MECHANISM FOR REMOVING SOIL SAMPLES FROM FLAT AUGERS
Filed Nov. 14, 1960 2 Sheets-Sheet 1

INVENTOR
Pope D. Cox
BY *Leon A. Russell*
ATTORNEY

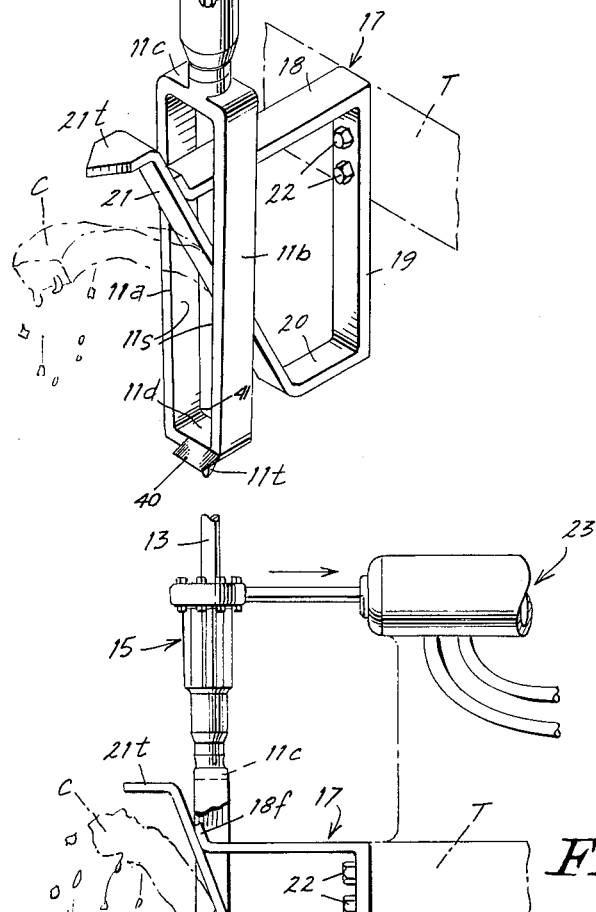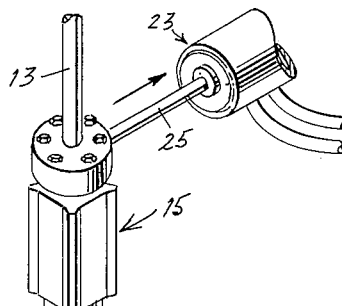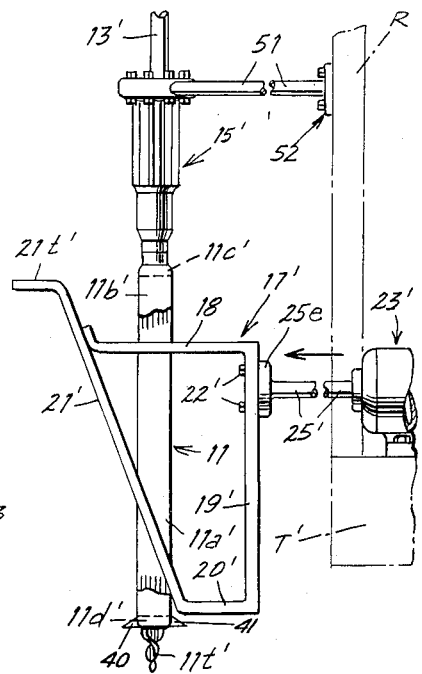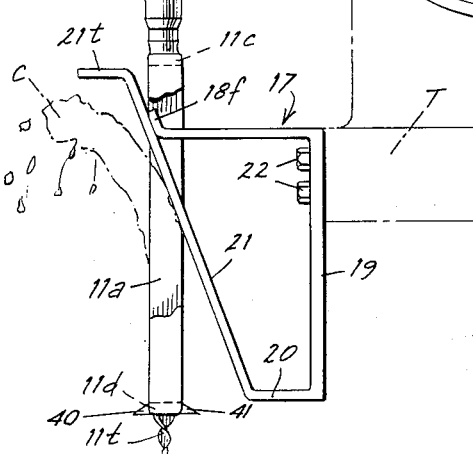
Oct. 9, 1962 P. D. COX 3,057,415
MECHANISM FOR REMOVING SOIL SAMPLES FROM FLAT AUGERS
Filed Nov. 14, 1960 2 Sheets-Sheet 2
Fig. 3
Fig. 5
Fig. 4
INVENTOR
Pope D. Cox
BY
ATTORNEY

United States Patent Office 3,057,415
Patented Oct. 9, 1962

3,057,415
MECHANISM FOR REMOVING SOIL SAMPLES FROM FLAT AUGERS
Pope D. Cox, Drumright, Okla., assignor of five percent to Felix A. Russell, and five percent to Peter D. Beter and Thurman Hill, Washington, D.C., and ten percent to Young, Young & Young, Sapulpa, Okla.
Filed Nov. 14, 1960, Ser. No. 68,726
13 Claims. (Cl. 175—84)

This invention relates to mechanism for removing soil samples from flat augers and it consists in the combinations, constructions and arrangements of parts herein described and claimed.

Generally there is provided a rotary drilling rig of conventional construction, mounted on a truck bed, said rig including a flat core cutting and removing auger, a novel core removing device positioned for dislodging the auger held soil sample core when said auger and said device are moved horizontally relatively to each other, and power operated means for producing the relative movement.

It is common practice to use drilling rigs employing rotary flat augers for taking soil samples at intervals over large areas. However, such practice has heretofore been relatively slow and has entailed considerable manual labor for removing each soil sample core by the use of shovels or similar hand tools. The present invention has been found to speed up the sampling job several times by substantially entirely eliminating the manual operations previously required.

It is accordingly a principal object of this invention to provide a mechanical device designed to be attached to a truck mounted rotary drilling rig having a flat auger, and power operated by relative movement between the auger and the device for quickly and thoroughly removing the soil sample core from the auger.

It is another object to provide such a device which is of simple, economical and highly effective design.

It is a further object to provide a device of this type in which the core dislodging portion is tilted relatively to the axis of the core so as to progressively dislodge the core by relatively small forces, thereby minimizing potentially damaging strains on the rig and auger and requiring smaller and less expensive core dislodging power means.

Other and further objects of the invention will become apparent from a reading of the following specification taken in conjunction with the drawings, in which:

FIGURE 3 is a perspective view similar to FIGURE 1, but showing the parts in relative positions for effecting core dislodgement, FIGURE 4 is a side elevational view of the showing of FIGURE 3, and FIGURE 5 is a side elevational view of a modified embodiment of the invention.

Figure 1:
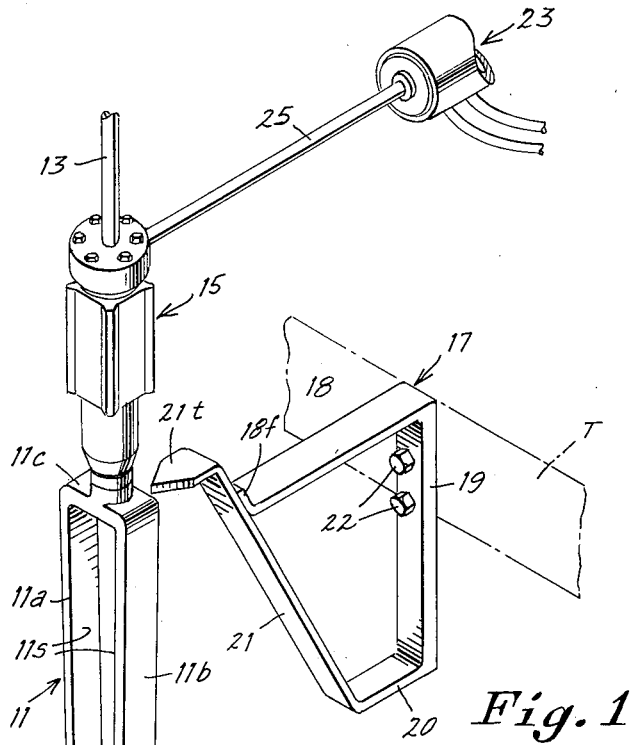
FIGURE 1 is a perspective view of a preferred embodiment of the device.
Figure 2:
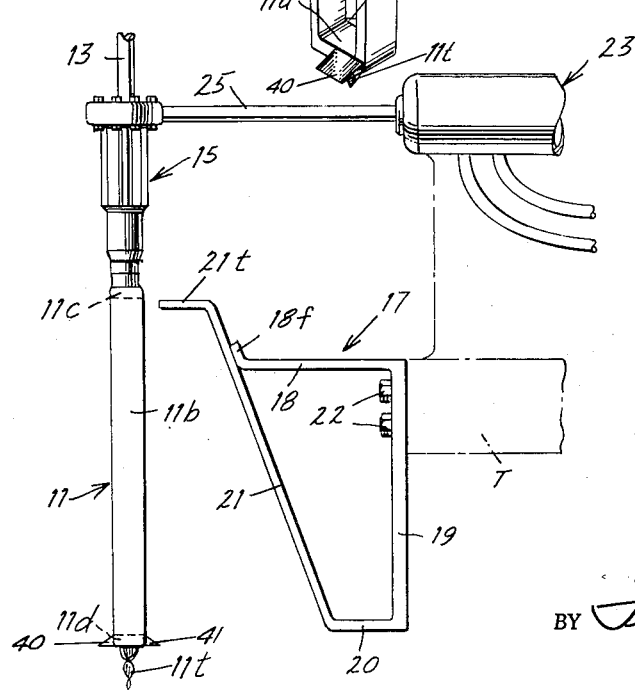
FIGURE 2 is a side elevational view of the disclosure of FIGURE 1.

With reference now to FIGURES 1 through 4 of the drawings, the numeral 11 generally designates a flat auger of substantially conventional construction and rigidly fixed to the lower end of a drive shaft 13 by which the same is rotated in drilling a soil core. Shaft 13 is vertically slidably journaled in a bearing structure generally designated 15. Bearing 15 is mounted on conventional rig structure (not shown) by which the shaft 13 and its attached auger are raised and lowered and otherwise moved for desired location, all in well known manner and by conventional rig apparatus.

The flat auger 11 comprises a pair of substantially parallel cutting blades 11a and 11b concentrically disposed about the vertical axis of the auger 11. Blades 11a and 11b are held in rigid spaced parallelism by top and bottom bridging portions 11c and 11d integrally formed therewith.

Since the auger 11 is of generally conventional construction, the showing herein is partially schematic, that is, the illustration thereof in the drawings shows schematically the size and shape and its position relative to the other parts of the apparatus, rather than showing details of construction thereof, such as a sharpened leading edge on the blades 11a and 11b and the angled and sharpened leading edges 40 and 41 on the bridging element 11d which in well-known manner are angled downwardly for spirally digging into the earth as the drill is simultaneously rotated and lowered into the earth.

The numeral 17 generally designates the soil sample core dislodging device which largely embodies the essence of the herein disclosed invention. Device 17 is herein illustrated as being formed of metallic straps 18, 19, 20 and 21 rigidly joined together at their ends to define a quadrilateral frame, as shown. The elements 18—21 can initially be a single strip of metal bent into the shape shown, or can be composed of any desired number of elements welded or otherwise rigidly connected at their ends to adjacent elements.

End flanges such as 18f may be employed where desired to increase the area of contact between the ends of adjacent elements for producing strengthened weld joints. The vertical attachment element 19 of the member 17 is desirably of heavier gauge material than the other elements of the structure 17. In the event the structure 17 is made of a continuous strip of metal stock the element 19 can in known manner be built up by laminating thereto a second strip (not shown) and by joining the laminated strips by welding, brazing or other conventional methods.

Element 19 of frame 17 is apertured adjacent its upper end to receive the bolts 22 by which the frame 17 is rigidly fixed to the rear vertical edge T of the truck bed upon which the drilling rig (not shown) is mounted in conventional manner.

Thus the soil core dislodging device 17 is held in fixed relation to the drilling rig and at a height and in a position for engaging and dislodging the soil sample core when the flat auger is moved into engagement therewith by mechanism next to be described.

While drilling rigs of the type herein disclosed include power operated means for moving the drill laterally into desired positions, for the purpose of illustration a fluid actuated cylinder generally designated 23 is somewhat schematically disclosed as being the means for moving the auger 11 toward core dislodging engagement with the device 17. The piston rod 25 of the double acting fluid actuated cylinder 23 is shown coupled to the bearing 15 for effecting the relative movements best illustrated by FIGURES 3 and 4.

In the species of FIGURE 5, primed reference characters designate parts thereof corresponding to their unprimed counterparts in FIGURES 1–4. However, in this modification of the invention the bearing structure 15' is more or less schematically shown as being relatively non-movably attached to the drilling rig member R by a support rod 51 connected to the rig by an attaching device 52. In this species relative movement of the core dislodging device 17' is effected by a fluid operated cylinder 23' acting thereon by and through its piston rod 25'. The end 25e of piston rod 25' is enlarged to provide a seat against which the rear element 19' of the core dislodging device 17' is firmly attached as by the screws 21'.

In the operation of the device of FIGURES 1 through 4 the truck mounting the drilling rig is driven to the site at which soil samples are to be taken. The flat auger 11 is then positioned above the point of sampling and is rotated by the shaft 13 as driven by the rig mechanism (not shown) and the auger 11 is driven vertically downwardly into the soil being rotated by said shaft 13 and at the same time advanced into the soil in known manner, the penetration thereof being assisted by the spiral tip 11t. When the auger 11 has been driven to desired depth into the soil and its interior hollow space 11s has become filled with the sample core, the auger is withdrawn to the position of FIGURES 1 and 2. Then by energization of the cylinder 23 the auger 11 is caused to move toward and over the core dislodging device 17 (as shown in FIGURES 3 and 4) causing the downward and rearward dislodging of the core C, the beginning of which dislodging is illustrated in said figures. The forwardly bent and pointed upper tip of the element 21, the same being designated 21t, aids the initial penetration of the core dislodging device 17 at the very top of the core C.

In the operation of the species of FIGURE 5, the steps are basically and generically the same as above described. However, in this modification of the device, it is the core dislodging device 17' that is moved relative to the apparatus as a whole in place of its being stationary as in the previously described species.

While but one form of the invention has been shown and described herein, it will be readily apparent to those skilled in the art that many minor modifications may be made without departing from the spirit of the invention or the scope of the appended claims.

What is claimed is:

1. In apparatus for taking soil samples, said apparatus comprising a truck mounted rotary drilling rig, a flat auger movably connected to said rig for soil penetrating rotary and vertical movements and for horizontal drilling sample taking movement by said apparatus, said auger having a pair of substantially parallel spaced blades for progressively cutting and for retaining therebetween a soil sample core, the improvement comprising a soil sample removing member mounted on said apparatus and having a vertically disposed face portion of a height and width closely approximating the height and width of said soil sample core, and means for moving said auger and said soil sample removing member relative to each other for dislodging said core from said auger.

2. Apparatus according to claim 1, said soil sample removing member having its face tilted so as to progressively dislodge said core.

3. Apparatus according to claim 1, said soil sample removing member being fixed to said apparatus and said auger being movable to press said soil sample core against the face of said member.

4. Apparatus according to claim 1, said soil sample removing member being mounted for movement relative to said apparatus and including power operated means for moving said member for soil sample dislodgement.

5. Apparatus according to claim 4, said power operated means being a fluid actuated cylinder.

6. Apparatus according to claim 1, said soil sample removing member being formed of flat metallic bars jointed to form a quadrilateral frame having a vertical support element, a forwardly and upwardly sloping core dislodging element spaced from said support element, and upper and lower elements integrally joining said elements to form a rigid structure.

7. Apparatus according to claim 6, the upper end of said core dislodging element being bent forwardly toward the horizontal and being sharpened to facilitate penetration thereof adjacent the upper end of said core.

8. Apparatus for taking soil samples, comprising: a truck mounted rotary drilling rig, a flat auger movably connected to said rig for soil penetrating rotary and vertical movements and for horizontal sample taking movement by said apparatus, said auger having a pair of substantially parallel spaced blades for progressively cutting and for retaining therebetween a soil sample core, a soil sample removing member mounted on said apparatus and having a vertically disposed face portion of a height and width closely approximating the height and width of said soil sample core, and means for moving said auger and said soil sample removing member relatively to each other for dislodging said core from said auger.

9. Apparatus according to claim 8, said soil sample removing member having its face tilted so as to progressively dislodge said core.

10. Apparatus according to claim 8, said soil sample removing member being mounted for movement relative to said apparatus and including power operated means for moving said member for soil sample dislodgement.

11. Apparatus according to claim 10, said power operated means being a fluid actuated cylinder.

12. Apparatus according to claim 8, said soil sample removing member being formed of flat metallic bars joined to form a quadrilateral frame having a vertical support element, a forwardly and upwardly sloping core dislodging element spaced from said support element, and upper and lower elements integrally joining said elements to form a rigid structure.

13. Apparatus according to claim 12, the upper end of said core dislodging element being bent forwardly toward the horizontal and being sharpened to facilitate penetration thereof into and adjacent the upper end of said core.

References Cited in the file of this patent

UNITED STATES PATENTS

| | | |
|---|---|---|
| 386,901 | Stanley | July 31, 1888 |
| 902,294 | Hermanns | Oct. 27, 1908 |
| 1,191,698 | Hoover et al. | July 18, 1916 |
| 1,877,067 | Sharp | Sept. 13, 1932 |
| 2,709,368 | Wolpert | May 31, 1955 |
| 2,985,973 | Struemph | May 30, 1961 |